United States Patent
Kurokawa

(10) Patent No.: US 7,428,857 B2
(45) Date of Patent: Sep. 30, 2008

(54) GEAR, SPEED REDUCTION GEAR USING THE SAME, AND ELECTRIC POWER STEERING APPARATUS USING THE SAME

(75) Inventor: Takanori Kurokawa, Osaka (JP)

(73) Assignee: Jtekt Corporation, Osaka (JP)

( * ) Notice: Subject to any disclaimer, the term of this patent is extended or adjusted under 35 U.S.C. 154(b) by 62 days.

(21) Appl. No.: 10/562,913

(22) PCT Filed: Jul. 6, 2004

(86) PCT No.: PCT/JP2004/009904

§ 371 (c)(1),
(2), (4) Date: Dec. 30, 2005

(87) PCT Pub. No.: WO2005/005864

PCT Pub. Date: Jan. 20, 2005

(65) Prior Publication Data

US 2006/0272438 A1    Dec. 7, 2006

(30) Foreign Application Priority Data

Jul. 9, 2003    (JP) .............................. 2003-194499

(51) Int. Cl.
*F16H 1/00*    (2006.01)
*B62D 3/00*    (2006.01)

(52) U.S. Cl. .................. 74/640; 74/216.3; 74/DIG. 10; 180/400; 525/432; 528/310; 528/324

(58) Field of Classification Search .................. 180/400; 74/640, 216.3, DIG. 10; 525/432; 528/310, 528/324

See application file for complete search history.

(56) References Cited

U.S. PATENT DOCUMENTS

| 4,722,996 A * | 2/1988 | Kanai et al. .................. 528/315 |
| 5,722,295 A | 3/1998 | Sakai et al. |
| 6,516,915 B2 | 2/2003 | Kurokawa et al. |

FOREIGN PATENT DOCUMENTS

| JP | 54-28359 | 3/1979 |
| JP | 60-47063 | 3/1985 |
| JP | 60-120022 | 6/1985 |
| JP | 9-89081 | 3/1997 |
| JP | 2002-156025 | 5/2002 |
| JP | 2003-83423 | 3/2003 |

* cited by examiner

*Primary Examiner*—Ana Woodward
(74) *Attorney, Agent, or Firm*—Rabin & Berdo, PC

(57) ABSTRACT

A gear composed of a polymer blend or a copolymer of PA66 and PA6 which contains a part having a PA66 molecular structure and a part having a PA6 molecular structure in a weight ratio of PA66/PA6=99.9/0.1 to 95.0/5.0 is excellent in durability as well as heat resistance and dimensional stability. A speed reduction gear using the gear has a reduced size, and can be used under a higher torque without a torque increase due to dimensional change of the gear. An electric power steering apparatus using the speed reduction gear has a reduced size, and can be used for a larger automobile.

8 Claims, 3 Drawing Sheets

GEAR, SPEED REDUCTION GEAR USING THE SAME, AND ELECTRIC POWER STEERING APPARATUS USING THE SAME

TECHNICAL FIELD

The present invention relates to a gear particularly suitable for use in a speed reduction gear having a small gear and a large gear such as a worm and a worm wheel, a speed reduction gear using the gear, and an electric power steering apparatus including the speed reduction gear.

BACKGROUND ART

Electric power steering apparatuses for automobiles generally employ a speed reduction gear. In a column-type EPS (Electric Power Steering System), for example, the speed reduction gear transmits rotation of an electric motor from a small gear such as a worm to a large gear such as a worm wheel for reduction of a rotation speed and amplification of an output, and then applies the output to a column for torque assist of a steering operation.

For an electric power steering apparatus for use in a light four-wheel automobile or in a relatively small ordinary automobile, for example, it has been a common practice in recent years to use a resin as a material for at least one of the small and large gears of the speed reduction gear, preferably the large gear, with the aim of reducing a teeth striking sound for noise reduction, reducing the weight of the gear and reducing a sliding resistance. More specifically, the large gear is composed of a metal core and an annular gear body of a resin fitted around the metal core.

Exemplary resins widely used as a material for the gear body include polyamide resins such as MC (monomer casting) nylon, PA6, PA66 and PA46. In order to suppress dimensional change mainly attributable to moisture absorption, heat and the like for improvement of the dimensional stability of the gear, reinforcement fibers such as glass fibers are blended in the polyamide resin (see, for example, JP-2002-156025-A2).

Similarly, a less moisture-absorptive polyamide resin such as PA12, PA11, PA612, PA610, an aromatic polyamide or a modified PA12 is blended in the aforesaid polyamide resin in order to suppress dimensional change due to moisture absorption for improvement of the dimensional stability of the gear (see, for example, JP-2003-83423-A2).

For an electric power steering apparatus for use in a larger automobile, it has also been contemplated in recent years to use a resin as a material for the gear of the speed reduction gear.

In recent years, an attempt has been made to further reduce the size of the electric power steering apparatus or to reduce a space required for installation of the electric power steering apparatus in an automobile irrespective of the size of the automobile for enhancing fuel economy to cope with environmental issues or for improving a cabin comfort in the automobile.

A gear composed of PA6 which is the most popular and the most excellent in strength characteristics and the like among the polyamide resins, however, suffers from a considerable dimensional change due to moisture absorption. Even if the dimensional stability of the gear is improved by the addition of the glass fibers as described above, the gear is liable to be expanded during transport of the automobile for overseas export or due to aging, whereby the torque of the electric power steering apparatus changes. In addition, the gear composed of PA6 is insufficient in heat resistance.

It is also conceivable to form the gear by PA66 which is the most popular next to PA6 among the polyamide resins, less susceptible to dimensional change due to moisture absorption and excellent in heat resistance.

Where the gear of PA66 is applied to the electric power steering apparatus for the larger automobile or the smaller size electric power steering apparatus described above, the gear fails to fully satisfy a durability requirement for the speed reduction gear, resulting in breakage at a relatively early stage.

This is because, as the size of the automobile is increased, a greater electric motor output is required and a torque to be transmitted through the speed reduction gear in the electric power steering apparatus is increased.

Further, as the size of the electric power steering apparatus is reduced, it becomes more difficult to increase the module of the large gear of the speed reduction gear for reduction of the face pressure of the gear, and the face pressure to be transmitted from the small gear tends to be increased.

In order to improve the dimensional stability by adding the less moisture-absorptive polyamide resin to the polyamide base resin, the less moisture-absorptive polyamide resin should be blended in a great amount on the order of 10 to 40 wt % based on the total amount of these resins. Therefore, even if PA6 having a higher strength is used as the polyamide resin, the gear for use in the electric power steering apparatus having a higher torque or a smaller size is insufficient in strength, resulting in breakage at a relatively early stage.

These problems are associated not only with the speed reduction gears for the electric power steering apparatuses but also with ordinary speed reduction gears having a small gear and a large gear.

DISCLOSURE OF THE INVENTION

An object of the present invention is to provide a novel gear which is more excellent in durability as well as heat resistance and dimensional stability than the prior art polyamide resin gear, a speed reduction gear using the same, and an electric power steering apparatus using the same.

A gear of the present invention comprises a gear body having tooth surfaces, characterized in that the gear body is composed of a compound resin which comprises a part having a PA66 molecular structure and a part having a PA6 molecular structure in a weight ratio of PA66/PA6=99.9/0.1 to 95.0/5.0.

According to the present invention, the gear body having the tooth surfaces is composed of the compound resin prepared by blending or copolymerizing a small amount of PA6 with PA66. Therefore, the durability of the gear body is drastically improved as compared with a gear body composed of PA66 alone. The heat resistance and the dimensional stability of the gear body a real so drastically improved as compared with the gear body composed of PA6 alone.

A polymer blend of PA66 and PA6 or a copolymer of PA66 and PA6 is preferably used as the compound resin.

A speed reduction gear of the present invention comprises a small gear and a large gear and is characterized in that at least one of the small gear and the large gear is composed of the gear of the present invention described above. The speed reduction gear of the present invention is advantageous in that it has a reduce size or can be used under high torque without a torque increase due to dimensional change.

An electric power steering apparatus of the present invention is characterized in that rotation of an electric motor for steering assist is transmitted to a steering mechanism by reducing its speed through the speed reduction gear of the present invention. The electric power steering apparatus of the present invention is advantageous in that it has a reduced size or can be used for a large automobile.

BEST MODE FOR CARRYING OUT THE INVENTION

Figure 1:
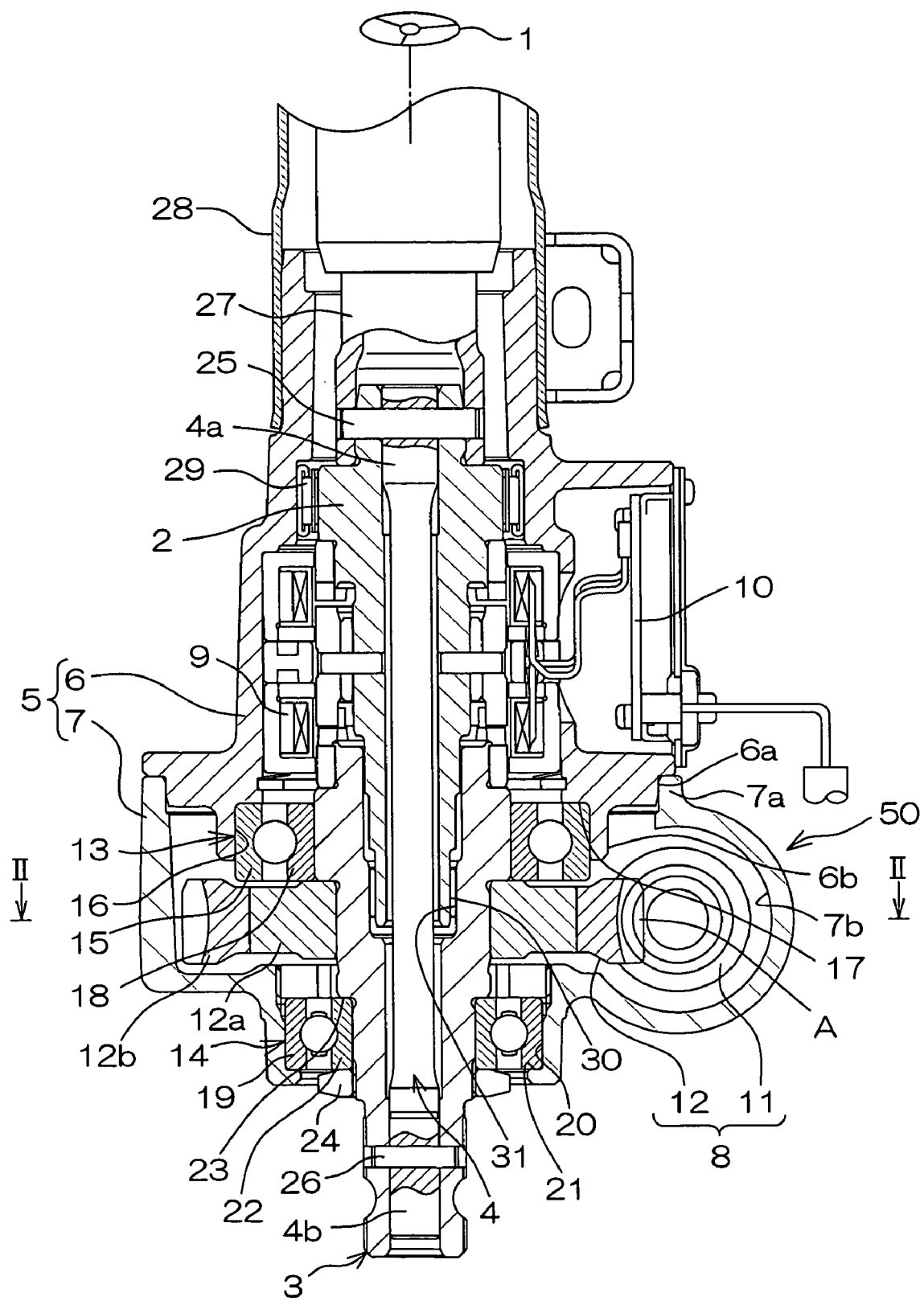
FIG. 1 is a schematic sectional view of an electric power steering apparatus according to one embodiment of the present invention.

The present invention will hereinafter be described in detail.

<Gear>

(Compound Resin)

As described above, the gear of the present invention includes a gear body having tooth surfaces, and the gear body is composed of a compound resin containing a part having a PA66 molecular structure (hereinafter referred to as "PA66 part") and a part having a PA6 molecular structure (hereinafter referred to as "PA6 part").

In the compound resin, the PA66 part and the PA6 part are present in a limited range of weight ratio of PA66/PA6=99.9/0.1 to 95.0/5.0.

If the proportion of the PA6 part is smaller than the aforesaid range, it is impossible to uniformly distribute such a small proportion of the PA6 part in the gear. Therefore, the compound resin cannot provide the effect of improving the durability of the gear.

If the proportion of the PA6 part is greater than the aforesaid range, the heat resistance and the dimensional stability of the gear are reduced.

In order to further improve the durability of the gear while maintaining the heat resistance and the dimensional stability of the gear at proper levels, the weight ratio between the PA66 part and the PA6 part in the compound resin is particularly preferably PA66/PA6=99.1/0.9 to 95.0/5.0.

As described above, a polymer blend prepared by blending a small amount of PA6 with PA66 or a copolymer prepared by copolymerizing a small amount of PA6 with PA66 is usable as the compound resin.

The polymer blend of PA66 and PA6 is prepared by blending PA66 and PA6 in the predefined ratio and melting and kneading the resulting mixture as implied by its name. Alternatively, PA66 and PA6 may be blended in a pellet form in the predetermined ratio.

PA66 as a material for the polymer blend preferably has the highest possible viscosity and, more specifically, has a relative viscosity of not lower than 100 as measured by a formic acid method. Where the gear is produced from the polymer blend employing such a high viscosity PA66, the durability of the gear is further improved.

A copolymer prepared by copolymerizing caprolactam as a material for PA6 and an AH salt (obtained by reaction of hexamethylenediamine and adipic acid in a ratio of 1:1) as a repetition unit of PA66 in the predetermined ratio may be used as the copolymer.

(Additives)

Various known additives may be blended in the aforesaid compound resin.

Examples of the additives include reinforcement fibers for improving the dimensional stability of the gear, and particulate or powdery fillers.

Examples of the reinforcement fibers include inorganic fibrous materials such as glass fibers, carbon fibers, asbestos fibers, silica fibers, alumina fibers, zirconia fibers, boron nitride fibers, silicon nitride fibers, boron fibers and potassium titanate fibers, metal fibrous materials such as of stainless steel, aluminum, titanium, steel and brass, and high melting point organic fibrous materials such as of aramids, polyamides, fluorocarbon resins, polyester resins and acryl resins.

Examples of the particulate or powdery fillers include mica, silica, talc, alumina, kaolin, calcium sulfate, calciumcarbonate, titaniumoxide, ferrite, clay, glass powder, zinc oxide, nickel carbonate, iron oxide, quartz powder, magnesium carbonate and barium sulfate.

Other examples of the additives include resin modifiers, lubricants, fire retardants and colorants such as dyes and pigments.

The amounts of the additives to be blended in the compound resin are not particularly limited, but the additives may each be blended in an optimal amount.

(Gear)

By employing the compound resin containing the PA66 part and the PA6 part in the predetermined ratio and, as required, any of the aforesaid additives, the gear of the present invention is produced in the same manner as in the prior art by injection molding or the like.

A gear (e.g., a worm wheel) which includes a metal core and an annular gear body fitted around the metal core is produced by so-called insert molding. That is, a mold having a cavity conformal to the outer shape of the gear body and a metal core setting portion provided at the center thereof is employed, and the compound resin is heated to be melted and injected into the cavity from a nozzle of an injection molding machine and cooled to be solidified.

Alternatively, the production of the gear may be achieved by inserting the metal core into a center hole of the annular gear body preliminarily injection-molded to unify the metal core with the gear body while heating the metal core by high frequency induction heating.

Teeth on the outer periphery of the gear body may be formed at the molding, or may be formed by cutting or the like after the molding.

<Speed Reduction Gear and Electric Power Steering Apparatus>

Figure 2:
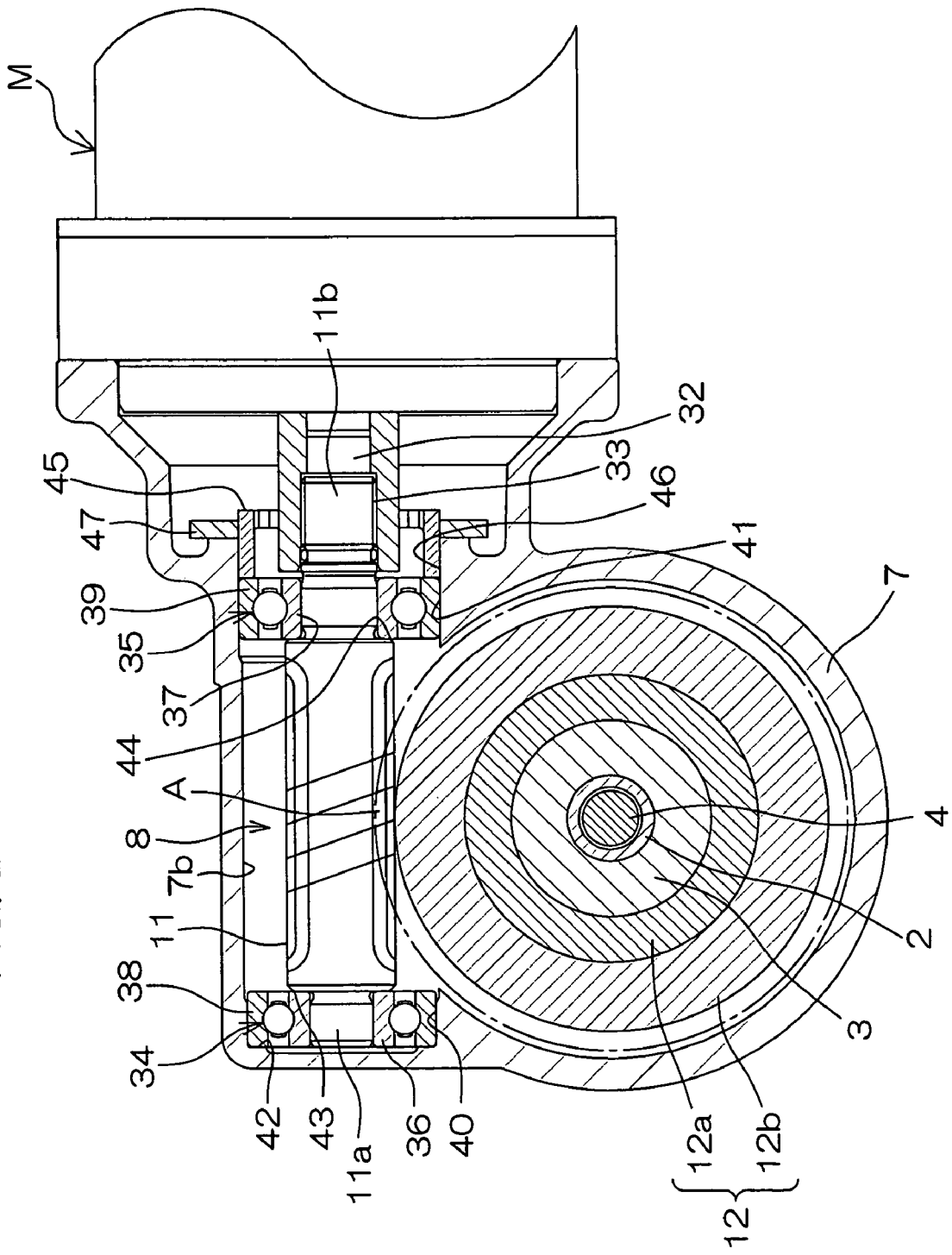
FIG. 2 is a sectional view taken along a line II-II shown in FIG. 1.

FIG. 1 is a schematic sectional view of an electric power steering apparatus according to an embodiment of the present invention. FIG. 2 is a cross-sectional view taken along a line II-II shown in FIG. 1.

Referring to FIG. 1, in the electric power steering apparatus in this example, a first steering shaft 2 serving as an input shaft to which a steering wheel 1 is attached and a second steering shaft 3 serving as an output shaft connected to a steering mechanism (not shown) such as a rack-and-pinion mechanism are coaxially connected to each other through a torsion bar 4.

A housing 5 for supporting the first and second steering shafts 2 and 3 is composed of an aluminum alloy, for example, and is attached to an automobile body (not shown). The housing 5 comprises a sensor housing 6 and a gear housing 7 which are fitted to each other. Specifically, the gear housing 7 has a cylindrical shape, and an annular edge 7a at its upper end is fitted in an annular step 6a in the outer periphery at a lower end of the sensor housing 6. The gear housing 7 accommodates a worm gear mechanism 8 serving as a speed reduction mechanism, and the sensor housing 6 accommodates a torque sensor 9, a control board 10, and so on. A speed reduction gear 50 is configured by accommodating the worm gear mechanism 8 in the gear housing 7.

The worm gear mechanism 8 comprises a worm wheel 12 which is rotatable integrally with an intermediate portion in the axial direction of the second steering shaft 3 and whose movement in the axial direction is regulated, and a worm shaft 11 (see FIG. 2) which is engaged with the worm wheel 12 and is connected to a rotating shaft 32 in an electric motor M through a spline joint 33.

The worm wheel 12 has the gear composition of the present invention described above, and comprises an annular metal core 12a coupled to the second steering shaft 3 so as to be integrally rotatable, and a gear body 12b formed of the above-mentioned compound resin surrounding the metal core 12a and having teeth formed on its outer peripheral surface.

The second steering shaft 3 is supported so as to be rotatable by first and second rolling bearings 13 and 14 arranged with the worm wheel 12 interposed on the upper and lower sides in the axial direction therebetween.

An outer ring 15 in the first rolling bearing 13 is fitted in a bearing holding hole 16 provided inside a cylindrical projection 6b at a lower end of the sensor housing 6 and is held therein. An upper end surface of the outer ring 15 is abutted against an annular step 17 so that the upward movement in the axial direction of the outer ring 15 relative to the sensor housing 6 is regulated.

On the other hand, an inner ring 18 in the first rolling bearing 13 is fitted in the second steering shaft 3 by way of interference fit. A lower end surface of the inner ring 18 is abutted against an upper end surface of the core metal 12a in the worm wheel 12.

An outer ring 19 in the second rolling bearing 14 is fitted in a bearing holding hole 20 in the gear housing 7 and is held therein. A lower end surface of the outer ring 19 is abutted against an annular step 21 so that the downward movement in the axial direction of the outer ring 19 relative to the gear housing 7 is regulated.

On the other hand, an inner ring 22 in the second rolling bearing 14 is attached to the second steering shaft 3 so as to be integrally rotatable and with the relative movement in the axial direction regulated. The inner ring 22 is interposed between a step 23 in the second steering shaft 3 and a nut 24 tightened into a screw of the second steering shaft 3.

The torsion bar 4 penetrates the first and second steering shafts 2 and 3. An upper end 4a of the torsion bar 4 is connected to the first steering shaft 2 so as to be integrally rotatable by a connecting pin 25, and a lower end 4b of the torsion bar 4 is connected to the second steering shaft 3 so as to be integrally rotatable by a connecting pin 26. A lower end of the second steering shaft 3 is connected to a steering mechanism such as a rack-and-pinion mechanism, as described above, through an intermediate shaft (not shown).

The connecting pin 25 connects the first steering shaft 2 and a third steering shaft 27 arranged coaxially with the first steering shaft 2 so as to be integrally rotatable. The third steering shaft 27 penetrates a tube 28 composing a steering column.

An upper part of the first steering shaft 2 is supported on the sensor housing 6 through a third rolling bearing 29 composed of a needle rolling bearing, for example, so as to be rotatable. A reduced diameter portion 30 in a lower part of the first steering shaft 2 and a hole 31 in an upper part of the second steering shaft 3 are fitted to each other with predetermined play provided therebetween in the direction of rotation so that the relative rotation between the first and second steering shafts 2 and 3 is regulated in a predetermined range.

Referring to FIG. 2, the worm shaft 11 is supported so as to be rotatable by fourth and fifth rolling bearings 34 and 35 held by the gear housing 7.

Inner rings 36 and 37 in the fourth and fifth rolling bearings 34 and 35 are fitted in corresponding constricted portions of the worm shaft 11. Further, outer rings 38 and 39 are respectively held in bearing holding holes 40 and 41 in the gear housing 7.

The gear housing 7 includes a portion 7b opposed to a part of a peripheral surface of the worm shaft 11 in the radial direction.

The outer ring 38 in the fourth rolling bearing 34 for supporting one end 11a of the worm shaft 11 is abutted against a step 42 in the gear housing 7 and is positioned therein. On the other hand, the inner ring 36 is abutted against a positioning step 43 in the worm shaft 11, thereby regulating the movement thereof toward the other end 11b.

The inner ring 37 in the fifth rolling bearing 35 for supporting the vicinity of the other end 11b of the worm shaft 11 (an end on the side of a joint) is abutted against a positioning step 44 in the worm shaft 11, thereby regulating the movement thereof toward the one end 11a. Further, the outer ring 39 is urged toward the foruth rolling bearing 34 by a screw member 45 for pre-load adjustment. The screw member 45 is screwed into a screw hole 46 formed in the gear housing 7, thereby applying a pre-load to the pair of rolling bearings 34 and 35 as well as positioning the worm shaft 11 in the axial direction. Reference numeral 47 denotes a lock nut which is engaged with the screw member 45 in order to fasten the screw member 45 after pre-load adjustment.

In the gear housing 7, an area including at least an engaged portion A of the worm shaft 11 and the worm wheel 12 is filled with the lubricant composition. That is, with the lubricant composition, only the engaged portion A may be filled, the engaged portion A and the whole of a peripheral edge of the worm shaft 11 may be filled, or the whole of the gear housing 7 may be filled.

The present invention is not limited to the above-mentioned embodiment. Various modifications can be made within the range of items described in the claims of the present invention. For example, the speed reduction gear is not limited to the speed reduction gear comprising the worm gear mechanism 8, but the construction is applicable to various speed reduction gears which employ a spur gear, a bevel gear, a hypoid gear, a helical gear, a rack gear and the like. The configuration of the speed reduction gear according to the present invention is applicable to speed reduction gears for apparatuses other than the electric power steering apparatus.

EXAMPLES

The present invention will be described in more detail on the basis of example.

(Preparation of Compound Resins)

High viscosity PA66 having a relative viscosity of 250 as measured by the formic acid method, PA6 and glass fibers were dry-blended, and the resulting mixtures were melted, kneaded and extruded to be palletized.

The weight ratios of PA66 and PA6 were varied within a range of PA66/PA6=99.9/0.1 to 98.7/1.3. For comparison, a resin was prepared by employing PA66 alone without addition of PA6.

As shown in FIGS. 1 and 2, worm wheels 12 which each include an annular metal core 12a and a gear body 12b fitted around the metal core 12a and having teeth on an outer periphery thereof were formed by an insert molding method employing pellets prepared in the aforesaid manner.

The worm wheels 12 were each incorporated in the speed reduction gear 50 of the electric power steering apparatus shown in FIGS. 1 and 2, and rotated in opposite directions under application of a load. Then, the number of cycles at which the gear body 12b was broken was determined. It is noted that the worm shaft 11 was composed of steel.

Figure 3:
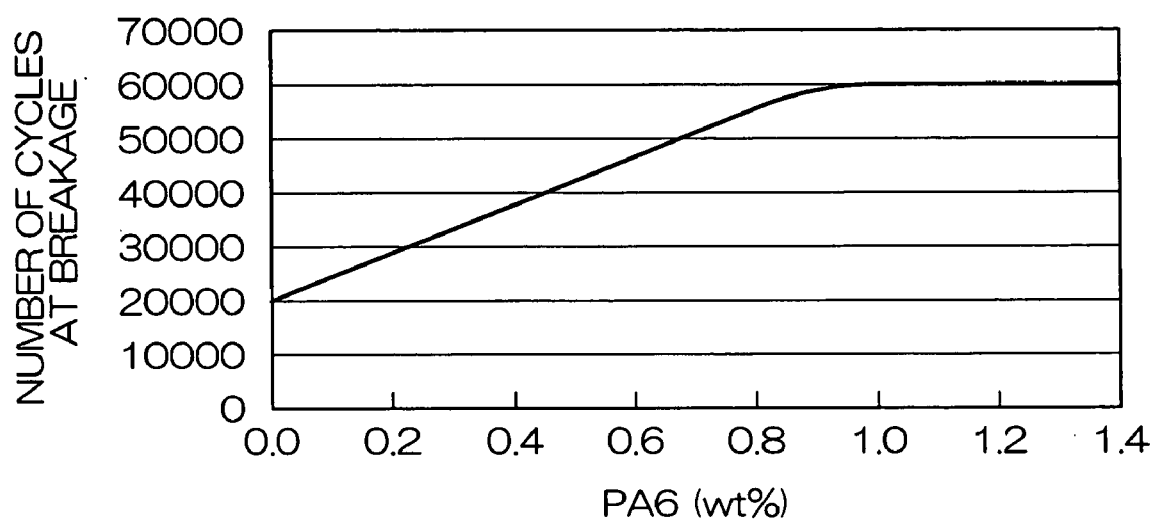
FIG. 3 is a graph illustrating a relationship between the proportion of PA6 in the compound resin of a gear body of a worm wheel and the number of cycles at which the gear body is broken when the worm wheel incorporated in the electric power steering apparatus is rotated in opposite directions at the example of the present invention.

The results are shown in FIG. 3.

As can be seen from FIG. 3, the durability of the worm wheel 12 was improved by the addition of PA6 to PA66, as compared with a case where PA66 was employed alone. It was confirmed from FIG. 3 that the durability of the worm wheel 12 was improved particularly where the weight ratio of PA6 was greater than PA66/PA6=99.1/0.9.

The invention claimed is:

1. A gear comprising a gear body having tooth surfaces, characterized in that the gear body is composed of a polymer blend of PA66 and PA6 in a weight ratio of PA66/PA6=99.9/0.1 to 95.0/5.0.

2. A speed reduction gear comprising a small gear and a large gear, characterized in that at least one of the small gear and the large gear is composed of the gear of claim 1.

3. An electric power steering apparatus, characterized in that rotation of an electric motor for steering assist is transmitted to a steering mechanism by reducing its speed through the speed reduction gear of claim 2.

4. The gear according to claim 1, wherein weight ratio of PA66/PA6 is 99.1/0.9 to 95.0/5.0.

5. A gear comprising a gear body having tooth surfaces, characterized in that the gear body is composed of a copolymer of PA66 and PA6 in a in a weight ratio of PA66/PA6=99.9/0.1 to 95.0/5.0 prepared by copolymerizing caprolactam as a material for PA6 and an AH salt obtained by reaction of hexamethylenediamine and adipic acid in a ratio of 1:1 as a repetition unit of PA 66.

6. A speed reduction gear comprising a small gear and a large gear, characterized in that at least one of the small gear and the large gear is composed of the gear of claim 5.

7. An electric power steering apparatus, characterized in that rotation of an electric motor for steering assist is transmitted to a steering mechanism by reducing its speed through the speed reduction gear of claim 6.

8. The gear according to claim 3, wherein weight ratio of PA66/PA6 is 99.1/0.9 to 95.0/5.0.

* * * * *